United States Patent
Beck (10) Patent No.: US 9,350,984 B2
(45) Date of Patent: May 24, 2016

(54) IMAGERS WITH ERROR GENERATION CAPABILITIES

(71) Applicant: Semiconductor Components Industries, LLC, Phoenix, AZ (US)

(72) Inventor: Jeffery Beck, Philomath, OR (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 80 days.

(21) Appl. No.: 14/288,201

(22) Filed: May 27, 2014

(65) Prior Publication Data

US 2015/0350638 A1    Dec. 3, 2015

(51) Int. Cl.
*H04N 5/217* (2011.01)
*H04N 17/00* (2006.01)
*G06T 7/00* (2006.01)
*H04N 5/225* (2006.01)

(52) U.S. Cl.
CPC ............ *H04N 17/002* (2013.01); *G06T 7/0018* (2013.01); *H04N 5/2257* (2013.01); *G06T 2207/10004* (2013.01); *G06T 2207/30252* (2013.01)

(58) Field of Classification Search
CPC ..... B60R 11/04; H04N 17/002; H04N 17/045
USPC .......................................... 348/181, 187, 188
See application file for complete search history.

(56) References Cited

U.S. PATENT DOCUMENTS

| | | | | |
|---|---|---|---|---|
| 4,228,537 A * | 10/1980 | Henckels | ............ | G06F 11/261 714/33 |
| 7,679,542 B2 | 3/2010 | Ham et al. | | |
| 8,730,330 B2 * | 5/2014 | Solhusvik | ............ | H04N 5/335 348/187 |
| 2009/0091808 A1 * | 4/2009 | Bailey | ................... | H04N 1/409 358/504 |
| 2013/0027565 A1 * | 1/2013 | Solhusvik | ............ | H04N 5/335 348/187 |
| 2013/0162761 A1 | 6/2013 | Goldemann | | |
| 2014/0100770 A1 | 4/2014 | Chiang | | |

* cited by examiner

*Primary Examiner* — Gary C Vieaux
(74) *Attorney, Agent, or Firm* — Treyz Law Group, P.C.; Andrew C. Milhollin (57) ABSTRACT

A system may include a camera module having error generation circuitry, and processing circuitry that processes image data from the camera module. The processing circuitry may include error detection circuitry that monitors or otherwise processes the image data to verify correct operation of the camera module. To test for correct operation of the error detection circuitry, the processing circuitry may provide a control signal to the camera module that enables error generation and selects a type of fault for the error generation circuitry to emulate. In response to receiving the control signal, the error generation circuitry may emulate the fault at the camera module to produce faulty image data. The error generation circuitry may emulate the fault by modifying control signals at the camera module or modifying the digital image data stream produced by the camera module.

20 Claims, 5 Drawing Sheets

IMAGERS WITH ERROR GENERATION CAPABILITIES

BACKGROUND

This relates generally to imaging systems, and more particularly to imaging systems for error-sensitive applications such as automotive applications.

Modern electronic devices such as cellular telephones, cameras, and computers often use digital image sensors. Imagers (i.e., image sensors) may be formed from a two-dimensional array of image sensing pixels. Each pixel receives incident photons (light) and converts the photons into electrical signals. Image sensors are sometimes designed to provide images to electronic devices using a Joint Photographic Experts Group (JPEG) format.

Circuitry such as image sensors can sometimes function incorrectly or produce erroneous image data. For example, manufacturing defects, software errors, environmental operating conditions, or cosmic radiation may undesirably affect the circuitry. Imagers that are used in error-sensitive applications such as automotive safety may have limited tolerance for incorrect operation. Consider the scenario in which image data from an image sensor is used to control an adaptive cruise control function or automatic braking function. In this scenario, incorrect image data from the image sensor that does not accurately reflect reality can be a safety hazard (e.g., malfunction of the adaptive cruise control or automatic braking).

An electronic device may include error checking circuitry for verifying the integrity of image data from an image sensor. However, it is possible for the error checking circuitry itself to become faulty. It would therefore be desirable to provide improved error checking capabilities for image sensors.

DETAILED DESCRIPTION

Imaging systems having digital camera modules are widely used in electronic devices such as digital cameras, computers, cellular telephones, and other electronic devices. A digital camera module may include one or more image sensors that gather incoming light to capture an image. Each sensor, or only some of the image sensors, may be provided with error generation and testing capabilities as described herein.

In some situations, imaging systems may form a portion of a larger system such as a surveillance system or a safety system for a vehicle (e.g., an automobile, a bus, or any other vehicle). In a vehicle safety system, images captured by the imaging system may be used by the vehicle safety system to determine environmental conditions surrounding the vehicle. As examples, vehicle safety systems may include systems such as a parking assistance system, an automatic or semi-automatic cruise control system, an auto-braking system, a collision avoidance system, a lane keeping system (sometimes referred to as a lane drift avoidance system), etc. In at least some instances, an imaging system may form part of a semi-autonomous or autonomous self-driving vehicle. Such imaging systems may capture images and detect nearby vehicles using those images. If a nearby vehicle is detected in an image, the vehicle safety system may sometimes operate a warning light, a warning alarm, or may operate active braking, active steering, or other active collision avoidance measures. A vehicle safety system may use continuously captured images from an imaging system having a digital camera module to help avoid collisions with objects (e.g., other automobiles or other environmental objects), to help avoid unintended drifting (e.g., crossing lane markers) or to otherwise assist in the safe operation of a vehicle during any normal operation mode of the vehicle. As another example, vehicle safety systems may include surround view of 3D range finding arrangements in which image data from multiple sensors are used.

Vehicle safety standards may require that the proper operation of any component of a vehicle safety system (including imaging system components) be verified before, during, and/or after operation of the vehicle. Verification operations for imaging system components may be performed by an imaging system prior to and/or after operation of a vehicle (e.g., upon startup and/or shutdown of the imaging system). In these verification operations, concurrent operation of the imaging system may not be required. In some scenarios, it may be desirable to continuously monitor the status of imaging system components during operation of the imaging system, particularly in situations in which vehicle safety may be influenced by the quality of imaging data provided by the imaging system. Imaging systems may, if desired, be provided having this type of on-the-fly (e.g., real-time) verification capability.

Image sensors may include arrays of image pixels. The pixels in the image sensors may include photosensitive elements such as photodiodes that convert the incoming light into electric charge. Image sensors may have any number of pixels (e.g., hundreds or thousands or more). A typical image sensor may, for example, have hundreds, thousands, or millions of pixels (e.g., megapixels). An image sensor may include verification circuitry (e.g., error detection circuitry) for verifying the correct operation of the image sensor. For example, in situations in which images captured by the image sensors are used as input to an active control system for a vehicle, verification circuitry in the image sensor may be configured to generate verification image data and compare the verification image data with an expected result so that incorrect image sensor data is not input into the active control system.

Verification image data may be compared with a predetermined standard stored in the imaging system or stored on additional circuitry that is external to the imaging system. The predetermined standard may be a mathematically determined threshold, may sometimes be referred to as a "golden" standard image, may be captured during manufacturing of the imaging system or at another suitable time (e.g., during startup or shutdown of the imaging system), and may include one or more mathematically or experimentally determined ranges to which verification image data may be compared.

Based on the result of the comparison of the verification image data with the predetermined standard, an imaging system may be disabled (e.g., if the result is outside the predetermined range), may continue to operate normally (e.g., if the result is within the predetermined range). In some arrangements, the imaging system may remain in operation but an indicator may be presented to users to inform the users that the imaging system needs further inspection and/or repair (e.g., the imaging system may present a "check imaging system" indication when the results of verification operations indicate a potential problem in the operation of the imaging system).

In some scenarios, it is possible for error detection circuitry of the imaging system to fail, thereby producing inaccurate results. For example, the error detection circuitry may fail to detect errors or may detect errors that do not exist. It would therefore be desirable to provide image systems with the capability of error-checking the error detection circuitry.

Figure 1:
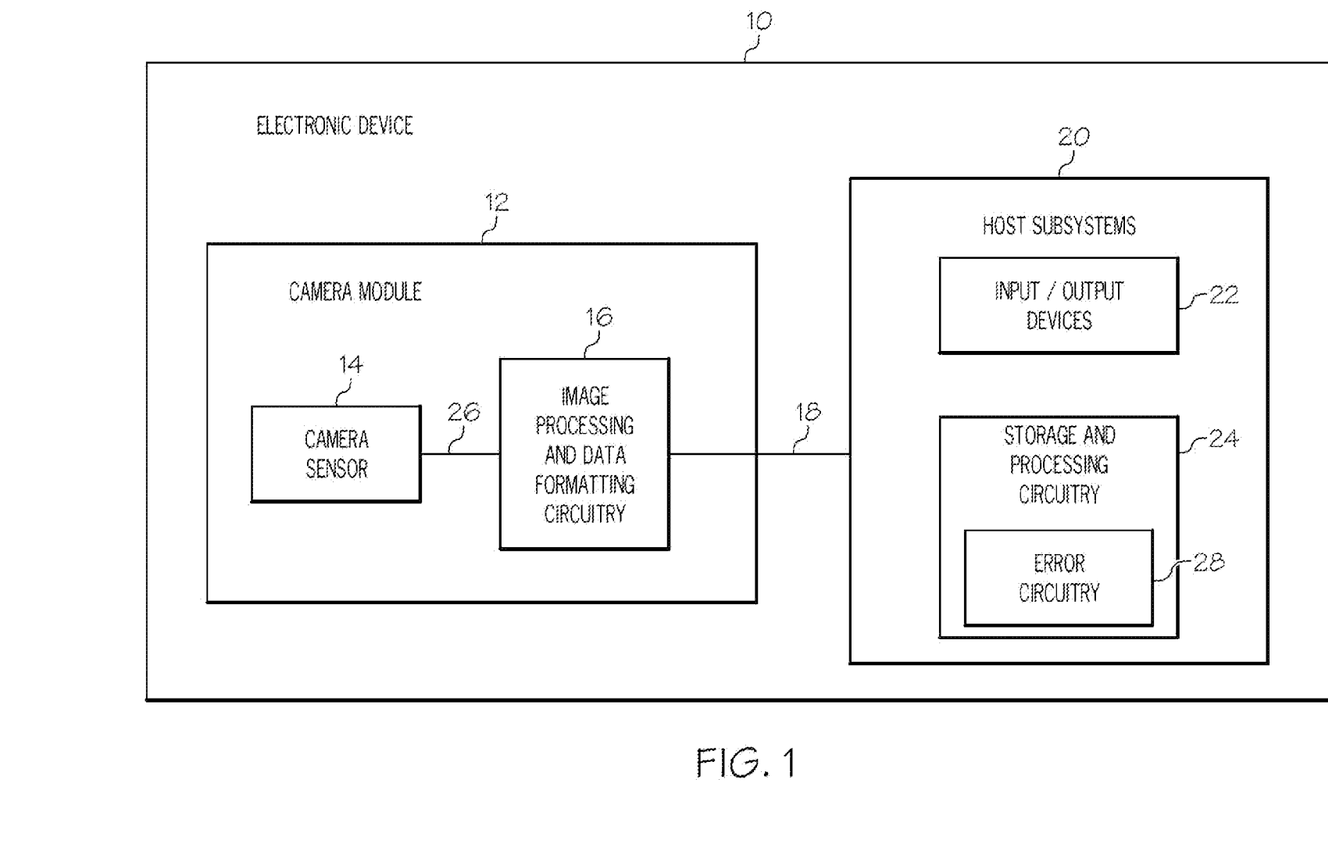
FIG. 1 is an illustrative schematic diagram of an electronic device with a camera sensor that may include an imager with error verification capabilities in accordance with an embodiment of the present invention.

Embodiments of the present invention relate to image sensors with error detection capabilities (e.g., error verification). An electronic device with a digital camera module is shown in FIG. 1. Electronic device 10 may be an automotive safety device, a digital camera, a computer, a cellular telephone, a medical device, or other electronic device. Camera module 12 may include image sensor 14 and one or more lenses. During operation, the lenses focus light onto image sensor 14. Image sensor 14 includes photosensitive elements (e.g., pixels) that convert the light into digital data. Image sensors may have any number of pixels (e.g., hundreds, thousands, millions, or more). A typical image sensor may, for example, have millions of pixels (e.g., megapixels). As examples, image sensor 14 may include bias circuitry (e.g., source follower load circuits), sample and hold circuitry, correlated double sampling (CDS) circuitry, amplifier circuitry, analog-to-digital (ADC) converter circuitry, data output circuitry, memory (e.g., buffer circuitry), address circuitry, etc.

Still and video image data from camera sensor 14 may be provided to image processing and data formatting circuitry 16 via path 26. Image processing and data formatting circuitry 16 may be used to perform image processing functions such as three-dimensional depth sensing, data formatting, adjusting white balance and exposure, implementing video image stabilization, face detection, etc. Image processing and data formatting circuitry 16 may also be used to compress raw camera image files if desired (e.g., to Joint Photographic Experts Group or JPEG format). In a typical arrangement, which is sometimes referred to as a system on chip (SOC) arrangement, camera sensor 14 and image processing and data formatting circuitry 16 are implemented on a common integrated circuit. The use of a single integrated circuit to implement camera sensor 14 and image processing and data formatting circuitry 16 can help to reduce costs.

Camera module 12 may convey acquired image data to host subsystems 20 over path 18 (e.g., image processing and data formatting circuitry 16 may convey image data to subsystems 20). Electronic device 10 typically provides a user with numerous high-level functions. In an automotive safety device, for example, a user may be provided with automotive safety features. In a computer or advanced cellular telephone, as another example, a user may be provided with the ability to run user applications. To implement these functions, host subsystem 20 of electronic device 10 may include storage and processing circuitry 24 and input-output devices 22 such as keypads, input-output ports, and displays. Storage and processing circuitry 24 may include volatile and nonvolatile memory (e.g., random-access memory, flash memory, hard drives, solid state drives, etc.). Storage and processing circuitry 24 may also include microprocessors, microcontrollers, digital signal processors, application specific integrated circuits, or other processing circuits.

Host subsystem 20 may, for example, be used to implement automotive safety systems such as lane departure warning systems, pedestrian detection systems, cruise control systems, or other systems that process image data from camera sensor 14. In applications that are sensitive to the integrity of image data from camera sensor 14, host system 20 may implement or otherwise include error detection circuitry 28 (e.g., as part of storage and processing circuitry 24) that processes image data from camera module 14 to determine whether sensor 14 and/or circuitry 16 is operating correctly. In some scenarios, error detection circuitry 28 may temporarily or permanently fail. For example, transistor aging, variations due to operating conditions, or single-event upsets (SEUs) can cause the error detection circuitry to fail to detect errors in the image data. Such failure may be unacceptable, particularly for sensitive applications such as automotive safety.

Imaging systems may be provided with verification capabilities for determining whether error checking circuitry is operating correctly. A camera module may be provided with error generation capabilities for producing image data with controlled error characteristics. Host subsystems may control the error characteristics in verifying whether error checking functions are being performed correctly.

Figure 2:
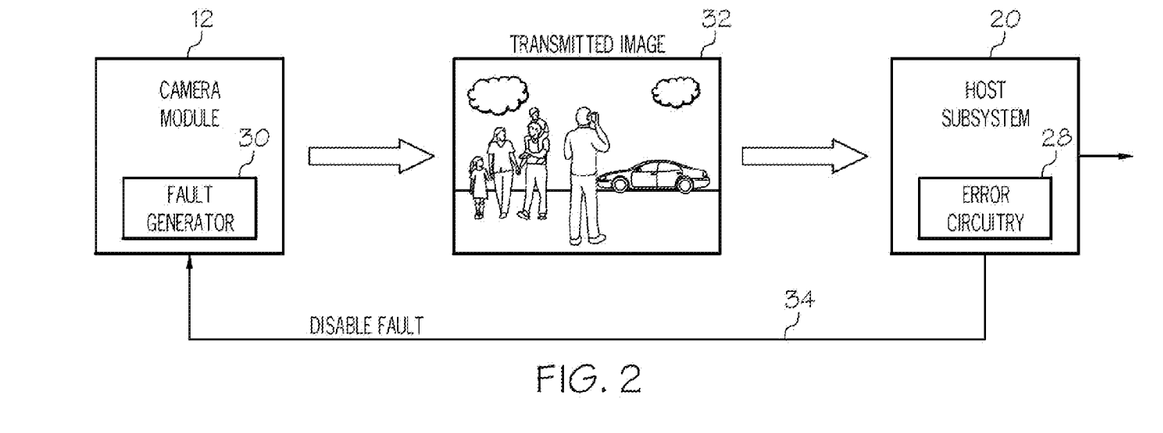
FIG. 2 is an illustrative diagram showing how a host system may control a camera module to generate image data in accordance with an embodiment of the present invention.

FIG. 2 is an illustrative diagram showing how a host system may receive and process image data from a camera module 12. As shown in FIG. 2, image 32 may be captured by camera module 12 and transmitted to host subsystem 20 (e.g., via path 18 of FIG. 1). Host subsystem 20 may perform functions such as automotive safety functions by processing transmitted image 32. For example, camera module 12 may transmit a stream of images including image 32 to host subsystem 20. In this scenario, host subsystem 20 may process or monitor the stream of images to determine whether a pedestrian is crossing, whether lane departure has occurred, or to perform any desired functions. Error circuitry 28 at host subsystem 20 may process image 32 in parallel to other operations performed by host subsystem 20. Error circuitry 28 may perform periodic or continuous error checking on image 32.

Camera module 12 may include error generation capabilities. Host subsystem 20 may provide a control signal to camera module 12 over path 34 that controls the error generation capabilities of camera module 12. During normal operation such as shown in FIG. 2, host subsystem 20 may disable the error generation capabilities of camera module 12 (e.g., host subsystem 20 may provide a control signal that disables fault generation so that camera module 12 produces a stream of image data normally).

Figure 3:
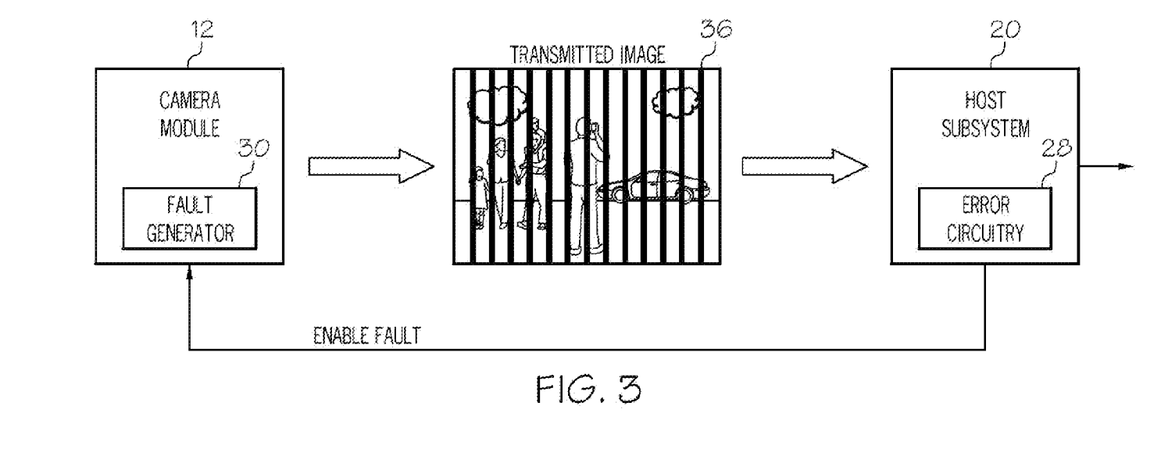
FIG. 3 is an illustrative diagram showing how a host system may control a camera module to generate desired faulty image data in accordance with an embodiment of the present invention.

FIG. 3 is an illustrative diagram showing how host subsystem 20 may verify whether error circuitry 28 is operating correctly. As shown in FIG. 3, host subsystem 20 may provide a control signal to camera module 12 that enables error generation. The control signal may direct camera module 12 to produce a desired fault that is selected by host subsystem 20. For example, error circuitry 28 may provide error checking for various fault scenarios such as row address faults, column address faults, temperature-based faults, or other faulty operations of camera module 12. Host subsystem 20 may test error checking circuitry 28 for each of these fault scenarios by controlling camera module 12 to emulate that fault scenario.

In the example of FIG. 3, host subsystem 20 may direct camera module 12 to generate faulty image data that represents a column address fault scenario. As shown in FIG. 3, the faulty image data may include erroneous vertical bars that override normal image data. Host subsystem 20 may use error circuitry 28 to detect the column address fault scenario (e.g., by processing transmitted image data 36). If error circuitry 28 fails to correctly detect the column address fault scenario, host subsystem 20 may determine that error circuitry 28 is faulty and suspend or disable any sensitive functions that depend on image data from camera module 12.

Figure 4:
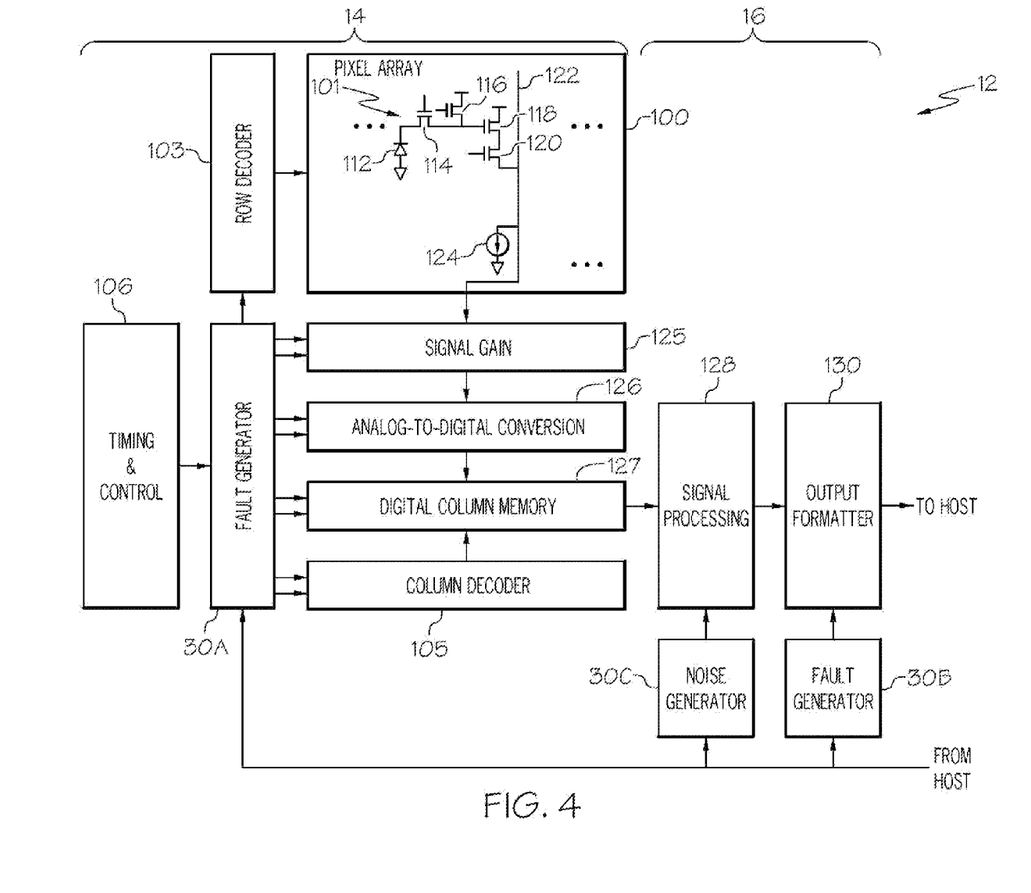
FIG. 4 is a block diagram of an illustrative camera module with fault generation circuitry in accordance with an embodiment of the present invention.

FIG. 4 is a diagram of an illustrative camera module 12 including controllable fault generation capabilities. As shown in FIG. 4, camera module 12 may include image sensor 14 and processing and data formatting circuitry 16. Image sensor 14 may include an array 100 of pixels 101 arranged in rows and columns. Each pixel may, for example, include photodiode 112, transfer gate 114, reset transistor 116, source-follower transistor 118, and row select transistor 120 (e.g., controlled by a row select signal from row decoder 103). Row lines (e.g., a row of pixels 101) may be selectively activated by row address decoder 103 and column lines 122 may be selectively activated by column address decoder 105. Thus, a row and column address is provided for each pixel.

Imager 14 may be operated by a timing and control circuit 106, which controls decoders 103 and 105 for selecting the appropriate row and column lines for pixel readout, and row and column driver circuitry which apply driving voltages (e.g., control signals) from the decoders to the transistors of the selected row and column lines. In response, the pixels produce pixel signals, which typically include a pixel reset signal and a pixel image signal for each pixel (or each photosensitive region of each pixel) that are amplified by signal gain circuitry 125 (e.g., amplifier circuits). The pixel image signals are sampled and converted from analog to digital values using analog-to-digital converter (ADC) circuitry such as column parallel ADC circuitry 126. The digital pixel values may be stored in digital column memory 127. Timing and control circuitry 106 may control column decoder 105 to read out and transmit digital values from digital column memory to processing and data formatting circuitry 16.

Signal processing circuitry 128 may receive the digital pixel values from digital column memory 127. Signal processing circuitry 128 may perform digital processing steps such as adjusting white balance and exposure, implementing video image stabilization, face detection, or other digital processing steps. Output formatter 130 may format the processed data for transmitting to a host such as host subsystem 20 of FIG. 2. If desired, output formatter 130 may compress the data using a desired encoding scheme such as JPEG encoding.

Camera module 12 may be provided with fault generation circuitry such as circuits 30A, 30B, and 30C that are controlled by fault-enable control signals. The fault-enable control signals may be provided from host circuitry (e.g., host subsystem 20 of FIG. 2). The fault generation circuitry may generate errors by introducing control signal faults or data signal faults during operation of camera module 12.

Fault generator circuit 30A may be used to generate faults in control signals generated by timing and control circuitry 106. In the example of FIG. 4, fault generator circuit 30A receives the control signals produced by timing and control circuitry 106. Fault generator circuit 30A may be controlled to introduce errors in the control signals. For example, fault generator circuit 30A may override row address signals to row decoder 103 with incorrect values to emulate scenarios in which row decoder 103 is faulty. As another example, fault generator circuit 30A may override column address signals to column decoder 105 (e.g., replacing one or more logic zero bit values with logic one values or vice versa). In this scenario, fault generator circuit 30A may emulate scenarios in which column decoder 105 is faulty. Control signals may be overridden using logic gates such as AND, OR, XOR, or other logic gates through which the control signals pass (e.g., the logic gate may combine control signals from circuitry 106 with fault-enable control signals from the host to produce modified control signals).

These examples are merely illustrative. Fault generator 30A may override any desired control signals from timing and control circuitry 106 for camera sensor 14 (e.g., control signals for signal gain circuitry 125, analog-to-digital conversion circuitry 126, digital column memory 127, etc.).

Fault generator circuit 30B may be used to generate faults in output formatter circuit 130. The Faults may be generated by overriding digital image data as specified by control signals from the host. In other words, fault generator circuit 30B may introduce faulty data into the digital image data produced by camera module 12. The faulty data for insertion may be specified by the host control signals. As an example, fault generator circuit 30B may be controlled to emulate wiring connection faults between camera module 12 and the host by overriding image data that would have been passed over the wiring connection faults.

In some scenarios, it may be desirable to emulate the effect of random noise on camera module 12. For example, transistors of sensor 14 and circuitry 16 may be subject to noise due to variations in environmental conditions such as temperature-based variations. These variations can cause corresponding errors in image data produced by camera module 12. Noise generator 30C may introduce noise in the digital image data to emulate noise-based fault scenarios. Noise generator 30C may, for example, include random number generator circuitry such as a linear feedback shift register that is controlled by the host to add random noise to the digital image data (e.g., emulating a condition such as the image sensor being subjected to elevated temperatures).

Figure 5:
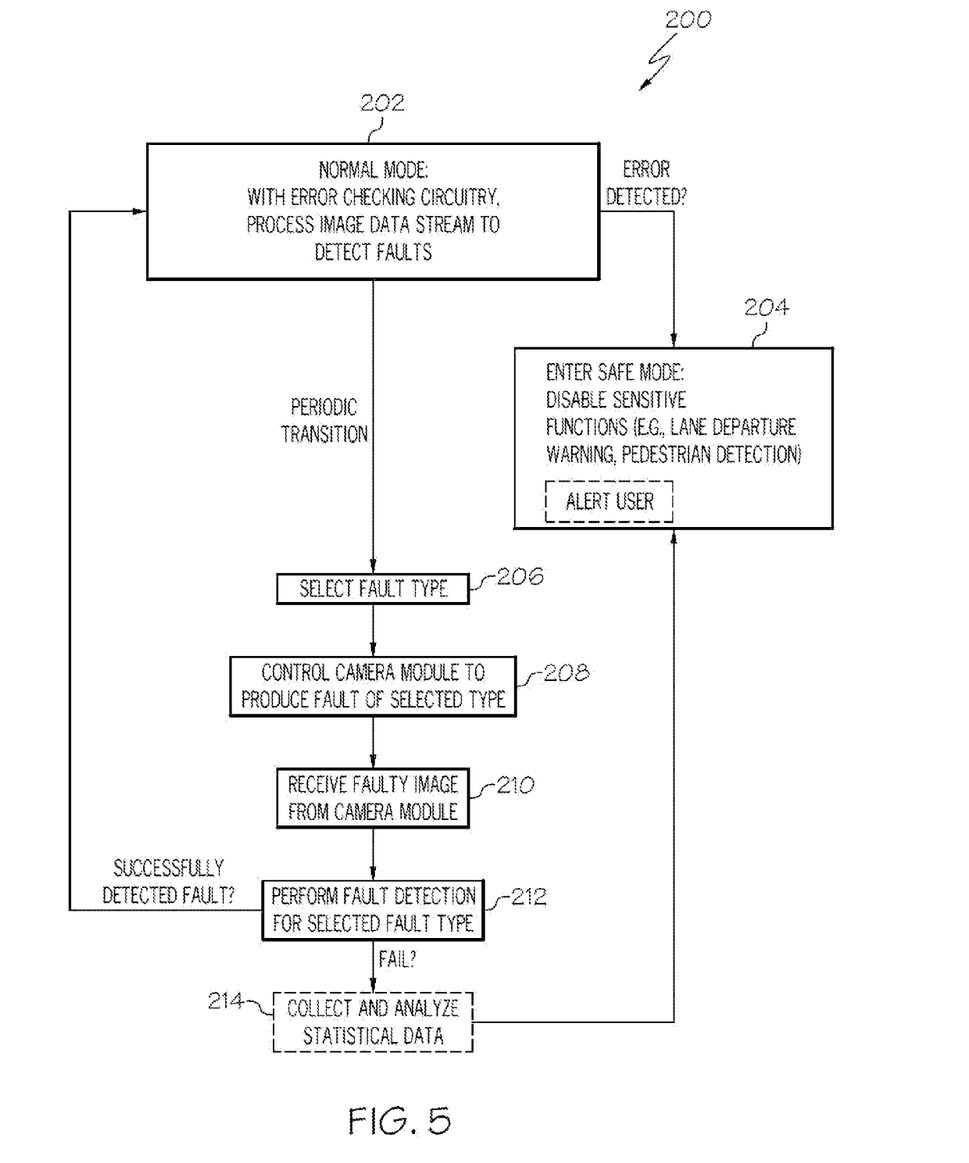
FIG. 5 is a flow chart of illustrative steps for generating faulty image data for testing error checking circuitry in accordance with an embodiment of the present invention.

FIG. 5 is a flow chart 200 of illustrative steps that may be performed by a host system in verifying the operation of error detection circuitry for a camera module. For example, the steps of flow chart 200 may be performed by host subsystem 20 in verifying the operation of error detection circuitry 28.

During step 202, the host system may operate normally. For example, the host system may perform automotive safety functions by processing a stream of images received from the camera module. Error checking circuitry at the host system may be used to process the image data stream to detect faults at the camera module. If an error is detected, the operations of step 204 may be performed to enter a safe mode of operation. Periodically during normal mode, the process may perform verification operations on the error checking circuitry by transitioning to step 206 from step 202. For example, while in normal mode, the host system may transition to step 206 for every 10 image frames that are received (or any desired number of image frames or period of time).

During step 204, the host system may operate in a safe mode in which sensitive functions may be disabled. Automotive safety operations that depend on the integrity of the image data may be disabled, because the error detection circuitry has detected an error in the image data. If desired, the host system may optionally alert a user such as a driver or other user (e.g., by displaying an alert on a display screen, providing an audible alert via a speaker, etc.).

Verification operations for the error checking circuitry may be performed from steps 206-212. During step 206, the host subsystem may select a fault type for testing. The fault type may be selected based on the capabilities of the camera module. For example, the camera module may include error generation circuitry capable of emulating a set of faults (e.g., row address faults, column address faults, control signal faults, wiring connection faults, temperature-induced faults, etc.). In this scenario, the host subsystem may select one or more faults from the available set for testing.

During step 208, the host subsystem may control the camera module to produce image data with a fault of the selected fault type. For example, the host subsystem may provide control signals to fault generation circuitry of the camera module that identifies the selected fault type and instructs the fault generation circuitry to produce image data based on the selected fault type.

During step 210, the host subsystem may receive a faulty image from the camera module. For example, camera module 12 of FIG. 4 may have captured an image using image sensor 14 such that the image includes errors as specified by the selected fault type.

During step 212, the host subsystem may operate the error checking circuitry to perform fault detection for the selected fault type. For example, the error checking circuitry may execute a detection algorithm for the selected fault type based on the faulty image. In response to successfully detecting the selected fault type, the host subsystem may determine that the error checking circuitry is operating correctly and return to step 202 to perform normal operations. In response to failing to detect the selected fault type (e.g., a different fault type is detected or no fault is detected), the host subsystem may proceed to step 204 to enter the safe mode of operation (e.g., disabling image-sensitive functions). If desired, the host subsystem may optionally perform the operations of step 214 to collect and analyze statistical data. For example, the host subsystem may perform multiple tests on each selected fault type by returning to step 206. In this scenario, the host subsystem may store the results of each test and analyze the stored results to determine whether to enter the safe mode (e.g., the host subsystem may compensate for testing variations).

Figure 6:
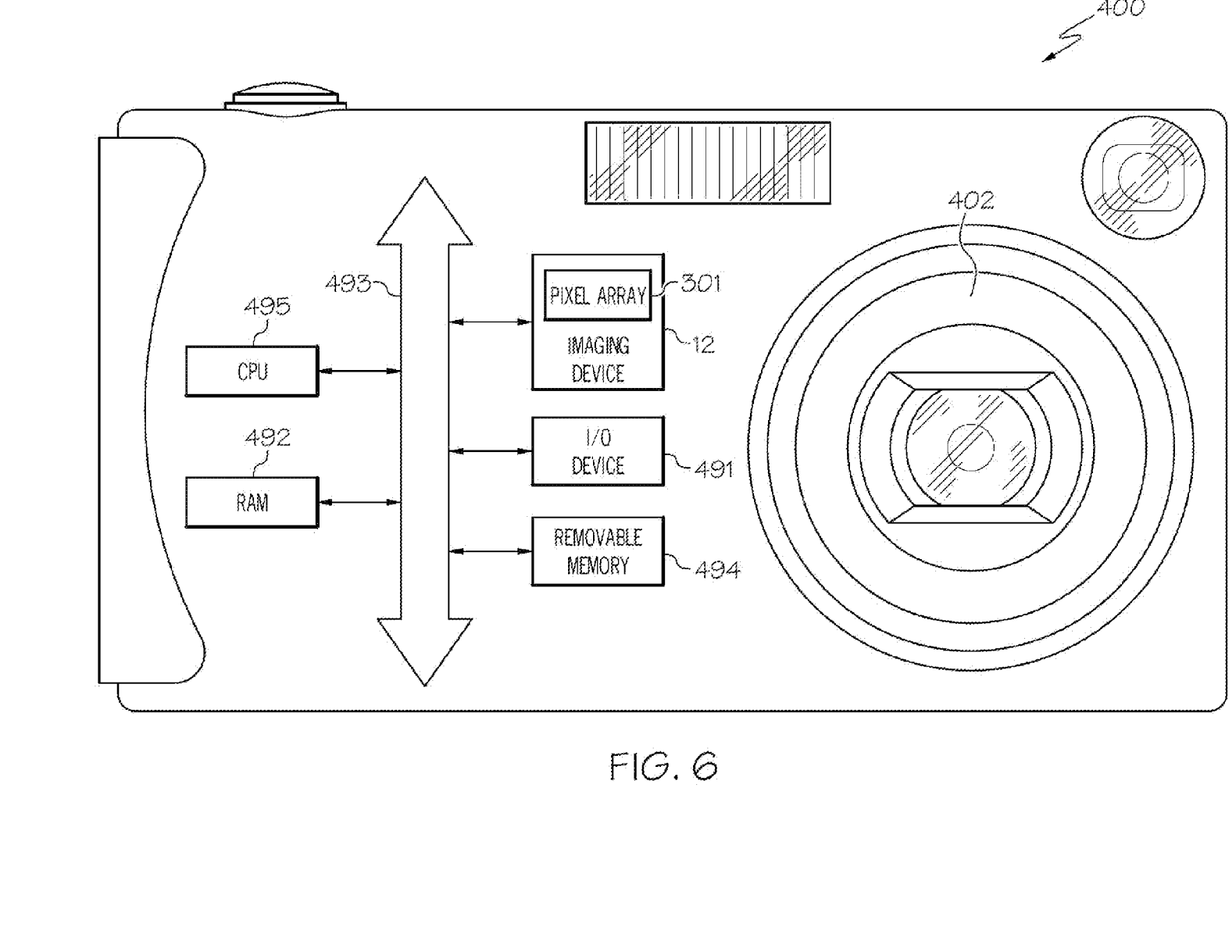
FIG. 6 is a block diagram of a processor system employing a camera module with error generation capabilities in accordance with an embodiment of the present invention.

FIG. 6 is a simplified diagram of an illustrative processor system 400, such as a video camera system, which includes an imaging device 12 (e.g., the camera module of FIG. 1) employing an imager with real time error detection circuitry as described above. The processor system 400 is exemplary of a system having digital circuits that could include imaging device 12. Without being limiting, such a system could include a computer system, still or video camera system, scanner, machine vision system, vehicle navigation system, video phone, surveillance system, auto focus system, star tracker system, motion detection system, image stabilization system, and other systems employing an imaging device.

Processor system 400, for example a digital video camera system or automotive safety system, generally includes a lens 402 for focusing an image on pixel array 301, central processing unit (CPU) 495, such as a microprocessor which controls camera and one or more image flow functions, which communicates with one or more input/output (I/O) devices 491 over a bus 493. Imaging device 12 also communicates with CPU 495 over bus 493. System 400 also includes random access memory (RAM) 492 and can optionally include removable memory 494, such as flash memory, which also communicates with CPU 495 over the bus 493. Imaging device 12 may be combined with the CPU, with or without memory storage on a single integrated circuit or on a different chip. Although bus 493 is illustrated as a single bus, it may be one or more busses, bridges or other communication paths used to interconnect system components of system 400.

Various embodiments have been described illustrating systems including camera modules with error generation circuitry. The system may include processing circuitry (e.g., host subsystems) that process image data from the camera modules. The image data may be processed to perform functions such as automotive safety functions. The processing circuitry may include error detection circuitry that monitors or otherwise processes the image data to verify correct operation of the camera module. The processing circuitry may provide control signals that instruct the camera module to operate normally or to generate faulty image data. To test for correct operation of the error detection circuitry, the processing circuitry may provide a control signal to the camera module that enables error generation and selects a type of fault for the error generation circuitry to emulate. In response to receiving the control signal, the error generation circuitry may emulate the fault at the camera module to produce faulty image data. The error generation circuitry may emulate the fault by modifying control signals at the camera module or modifying the digital image data stream produced by the camera module.

The foregoing is merely illustrative of the principles of this invention and various modifications can be made by those skilled in the art without departing from the scope and spirit of the invention.

What is claimed is:

1. A method of operating an electronic device having an image sensor, the method comprising:
    controlling fault generation circuitry at the image sensor to select a fault type and to produce a fault of the selected fault type in image data;
    with error detection circuitry, processing the image data to identify a fault type; and
    determining whether the identified fault type matches the selected fault type.

2. The method defined in claim 1 further comprising:
    in response to determining that the identified fault type fails to match the selected fault type, identifying that the error detection circuitry has failed.

3. The method defined in claim 2 further comprising:
    with processing circuitry, performing automotive safety functions in a normal mode by processing normal image data from the image sensor.

4. The method defined in claim 3 further comprising:
    in response to identifying that the error detection circuitry has failed, entering a safe mode in which the automotive safety functions are disabled.

5. The method defined in claim 4 further comprising:
    in response to determining that the identified fault type matches the selected fault type, continuing to perform the automotive safety functions in the normal mode with the processing circuitry.

6. The method defined in claim 4 further comprising:
    in response to identifying that the error detection circuitry has failed, alerting a user.

7. The method defined in claim 3 wherein controlling the fault generation circuitry at the image sensor to produce the fault of the selected fault type comprises:
    during the normal mode, periodically controlling the fault generation circuitry to produce the fault of the selected fault type.

8. The method defined in claim 1 wherein the image sensor comprises a plurality of pixels arranged in rows and columns and wherein the selected fault type comprises a row address fault.

9. The method defined in claim 1 wherein the image sensor comprises a plurality of pixels arranged in rows and columns and wherein the selected fault type comprises a column address fault.

10. The method defined in claim 1 wherein the selected fault type comprises a temperature-based fault type and wherein the image sensor produces the fault in the image data by capturing an image and adding randomly generated noise values to the captured image.

11. Circuitry, comprising:
   an image sensor that produces image data; and
   fault generation circuitry that receives a fault control signal, selects a fault type, and generates errors in the image data in response to the fault control signal to produce a fault of the selected fault type in the image data.

12. The circuitry defined in claim 11 wherein the image sensor comprises:
   a pixel array that produces pixel signals for the image data; and
   timing and control circuitry that generates pixel array control signals for the pixel array, wherein the fault generation circuitry generates the errors in the image data in response to the fault control signal by modifying the pixel array control signals.

13. The circuitry defined in claim 12 wherein the pixel array comprises a plurality of pixels arranged in rows and columns and wherein the image sensor comprises:
   row decoder circuitry that receives at least some of the pixel array control signals and generates row control signals for the rows of pixels, wherein the fault generation circuitry modifies the pixel array control signals to emulate faulty operation of the row decoder circuitry.

14. The circuitry defined in claim 13 wherein the image sensor further comprises:
   column decoder circuitry that receives at least some of the pixel array control signals and generates column control signals for the pixel array, wherein the fault generation circuitry modifies the pixel array control signals to emulate faulty operation of the column decoder circuitry.

15. The circuitry defined in claim 12 further comprising:
   digital signal processing circuitry that processes the pixel signals to produce the image data, wherein the fault generation circuitry adds digital values to the image data to emulate fault scenarios.

16. The circuitry defined in claim 15 wherein the fault generation circuitry comprises:
   noise generation circuitry that generates and adds the digital values to the image data.

17. The circuitry defined in claim 16 wherein the noise generation circuitry comprises a random number generator that generates the digital values and wherein the fault generation circuitry emulates temperature-based faults by adding the digital values to the image data.

18. A system, comprising:
   a central processing unit;
   memory;
   input-output circuitry; and
   an imaging device, wherein the imaging device comprises:
      an image sensor that produces image data; and
      fault generation circuitry that selects a fault type and generates errors in the image data in response to receiving a fault control signal to produce a fault of the selected fault type in the image data.

19. The system defined in claim 18 further comprising:
   a host subsystem, wherein the host subsystem performs automotive safety functions by processing the image data, wherein the host subsystem includes error detection circuitry that monitors the image data to identify faulty operation of the imaging device, wherein the host subsystem periodically transmits the fault control signal to the fault generation circuitry of the imaging device, and wherein the host subsystem determines whether the error detection circuitry is operating correctly based on whether the error detection circuitry correctly identifies the fault.

20. The system defined in claim 18 wherein the image sensor comprises:
   a pixel array that produces pixel signals for the image data; and
   control circuitry that produces control signals for the pixel array, wherein the fault generation circuitry modifies the control signals to generate the errors in the image data.

* * * * *